Nov. 4, 1930.  E. A. BENTON ET AL  1,780,697

PISTON RING

Filed Dec. 7, 1929

Inventor
Edward A. Benton
Mathius Linderner
By Clarence A. O'Brien
Attorney

Patented Nov. 4, 1930

1,780,697

UNITED STATES PATENT OFFICE

EDWARD A. BENTON AND MATHIUS LINDERNER, OF ALTOONA, PENNSYLVANIA

PISTON RING

Application filed December 7, 1929. Serial No. 412,475.

This invention relates to piston rings and more particularly to a device of this character which is primarily adapted for use in connection with steam engines but it is to be understood that a ring constructed in accordance with this invention may be used on any type of engine or piston for which the same is found adapted.

An important object of the invention is to provide, in a manner as hereinafter set forth, a piston ring of the aforementioned character having means therein for receiving and conducting lubricating oil from the chamber forwardly of the piston in the cylinder to a point substantially centrally in the cylinder wall engaging face of said ring.

Another important object of the invention is to provide, in a manner as hereinafter set forth, a piston ring of the character described having means provided intermediate the marginal edges of its walls engaging face for distributing the oil on said wall entirely around the ring in a manner to reduce wear and friction between the wall and the ring to a minimum and yet provide a leak-proof joint.

Other objects of the invention are to provide a piston ring of the aforementioned character which will be simple in construction, strong, durable, efficient in its use and which may be manufactured at low cost.

Other objects and advantages of the invention will become apparent from a study of the following specification, taken in connection with the accompanying drawings, wherein like characters of reference designate corresponding parts throughout the several views, and wherein:—

Figure 1:
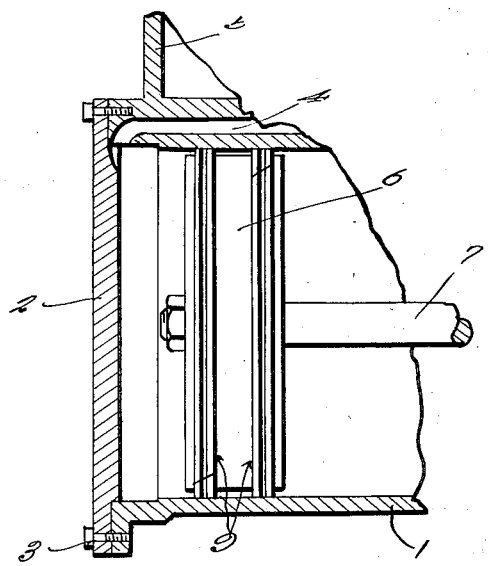
Figure 1 is a view in side elevation of a piston with a pair of rings constructed in accordance with this invention mounted thereon and disposed in a steam cylinder, the latter being shown fragmentarily and in vertical longitudinal section.
Figure 2:
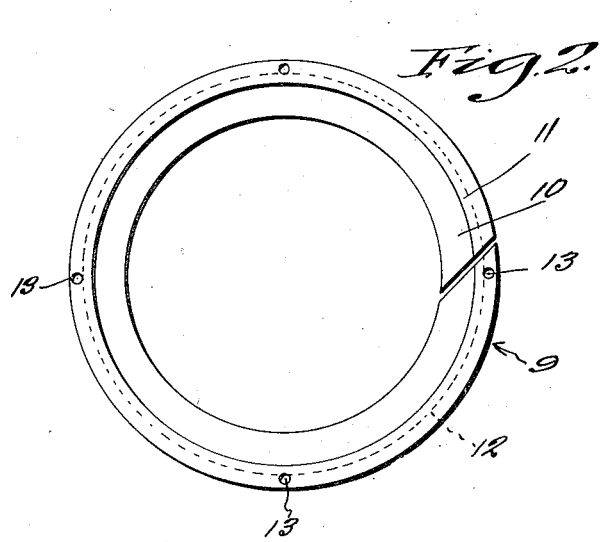
Figure 2 is a top plan view of the ring.
Figure 3:
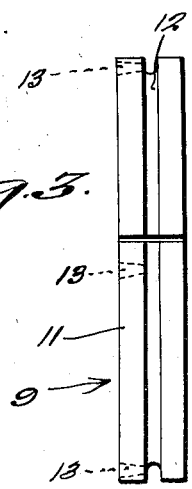
Figure 3 is a side elevation thereof.

Referring to the drawings in detail, the reference character 1 designates the forward end of a steam cylinder having the head plate 2 detachably secured to the forward end thereof through the medium of screw bolts 3 and steam is supplied to the interior of the cylinder 1 through the medium of the passage 4 which communicates with a valve chest 5. A piston 6 is mounted for reciprocation in the cylinder 1 and has connected thereto a piston rod 7. All of the foregoing is conventional and forms no part of this invention.

Figure 4:
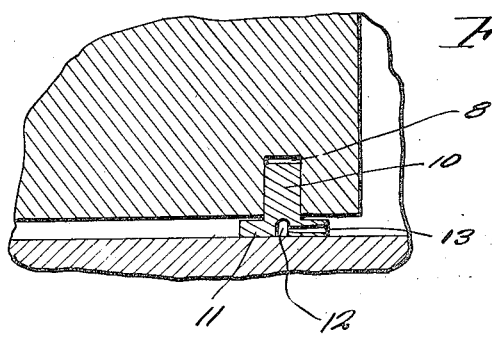
Figure 4 is a view of the ring in cross-section, the same being shown mounted on a piston and disposed in a cylinder which are fragmentarily shown in longitudinal section.

The piston 6 is provided with the usual circumferentially extending longitudinally spaced grooves 8. The piston 6 is of a diameter considerably smaller than the inner diameter of the cylinder 1, as seen most clearly in Figures 1 and 4 of the drawing.

The device constituting this invention comprises an annular split ring which is designated generally by the reference character 9 and which may be formed of any suitable material. As seen most clearly in Figure 4 of the drawing the ring 9 is of substantially T-shaped cross-section and comprises a web portion 10 which is slidably disposed in the annular groove 8 of the piston and has a cross head 11 formed integrally on its outer periphery and extending between the walls of the piston and the cylinder. The head 11 is provided with a centrally disposed circumferentially extending oil distributing groove 12 in its outer periphery and the upper portion of said head is provided with oil conducting ports 13 which are spaced circumferentially therearound and extend from the forward end of the head 11 to the groove 12. Any suitable number of the ports 13 may be provided in the head 11 and the groove 12 may be disposed at any desired point therein.

The ring 9 is of softer material than the cylinder 1 and by reason of this practically all of the wear which takes place will occur on said ring 9. It will be seen that a ring constructed in accordance with this invention maintains the piston 6 and the cylinder walls out of engagement with each other with the result that no frictional resistance or wear will occur therebetween.

When the ring is in operation in a steam engine, the lubricating oil which enters the steam chamber forwardly of the piston will enter the ports 13 and pass into the groove 12 where it will be distributed on the wall of the cylinder as the ring reciprocates therein. The passage of the lubricating oil through the ports 13 will be accelerated by the incoming steam forwardly of the piston, as will be understood.

It is believed that the many advantages of a piston ring constructed in accordance with this invention will be readily understood, and although the preferred embodiment of the invention is as illustrated and described, it is to be understood that changes in the details of construction may be had which will fall within the scope of the invention as claimed.

What is claimed is:—

1. A piston ring of the character described comprising an annular ring of substantially T-shaped cross-section having a circumferentially extending oil distributing groove in its outer periphery and oil conducting ports extending therefrom to the forward marginal edge of the ring.

2. In combination with a cylinder, a piston mounted for reciprocation in the cylinder and having a circumferential groove, said piston of less diameter than the cylinder, a ring of substantially T-shaped cross-section having a web portion disposed in the groove and a head portion extending between the piston and the cylinder on opposite side of the groove, said head being provided with an oil distributing groove on its outer periphery and being further provided with oil conducting ports extending from the oil distributing groove to the forward marginal edge of the head, said ports adapted to receive lubricating oil from the forward portion of the cylinder and conduct said oil rearwardly into the oil distributing groove.

3. A piston ring of the character described adapted to be disposed in the groove of a piston and including a right angularly disposed head portion extending rearwardly and forwardly from the groove and between the piston and the cylinder wall in which said piston is mounted, said head being provided, on its outer periphery, with an oil distributing groove and being further provided with circumferentially spaced oil conducting ports communicating with the oil distributing groove and the forward marginal edge of the head.

In testimony whereof we affix our signatures.

EDWARD A. BENTON.
MATHIUS LINDERNER.